United States Patent
Hauck

(10) Patent No.: US 6,943,916 B2
(45) Date of Patent: Sep. 13, 2005

(54) METHOD OF MINIMIZING TRAPPING, I.E., CHOKING OR SPREADING, IN A PRINTING-ORIGINAL PRODUCTION PROCESS

(75) Inventor: Axel Hauck, Karlsruhe (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 836 days.

(21) Appl. No.: 09/935,621

(22) Filed: Aug. 23, 2001

(65) Prior Publication Data

US 2002/0024679 A1 Feb. 28, 2002

(30) Foreign Application Priority Data

Aug. 23, 2000 (DE) .......................................... 100 41 191

(51) Int. Cl.[7] .......................... G06K 15/00; G06K 9/34; G06K 9/42; G06K 9/48
(52) U.S. Cl. .......................... 358/1.9; 358/1.6; 358/2.1; 382/178; 382/193; 382/199; 382/256; 382/257
(58) Field of Search .......................... 358/1.9, 1.6, 2.1, 358/504, 530, 443, 464, 465; 382/178, 193, 199, 256, 257, 258

(56) References Cited

U.S. PATENT DOCUMENTS

| 4,583,116 A | 4/1986 | Hennig et al. | ................. 358/75 |
| 2002/0044802 A1 * | 4/2002 | Tsuruya et al. | ............. 399/322 |

FOREIGN PATENT DOCUMENTS

| DE | 196 38 967 C2 | 4/1998 | ........... B41F/33/10 |
| JP | 10058785 | * 3/1998 | ............ B41J/19/96 |

* cited by examiner

*Primary Examiner*—Jerome Grant, II
(74) *Attorney, Agent, or Firm*—Laurence A. Greenberg; Werner H. Stemer; Ralph E. Locher

(57) ABSTRACT

A method of determining trapping, i.e., spreading or choking, in color boundary areas in a printed image, includes characterizing with respect to register behavior one of a printing machine and a printing machine type, respectively, performing a printing; determining the printing-machine specific register behavior with knowledge of influencing factors relating to the color to be printed and the printing material to be printed on for the job being printed; calculating minimum required spreadings and chokings, respectively, while taking a safety margin into account; and taking into account minimum geometric overlaps in producing an original.

8 Claims, 3 Drawing Sheets

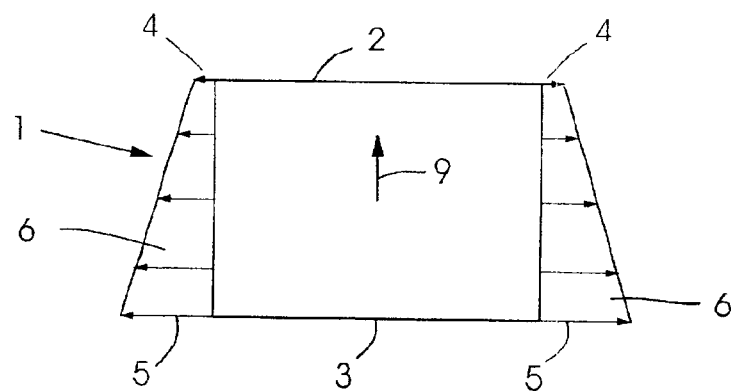
Fig.1.1
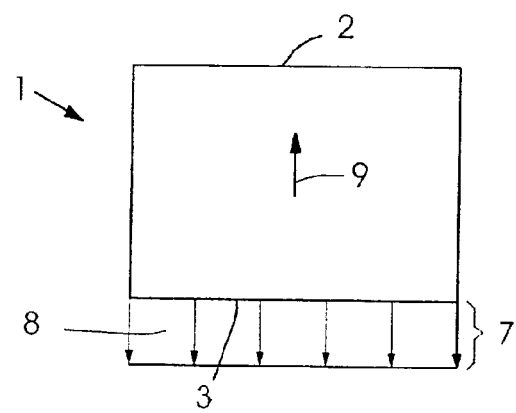
Fig.1.2
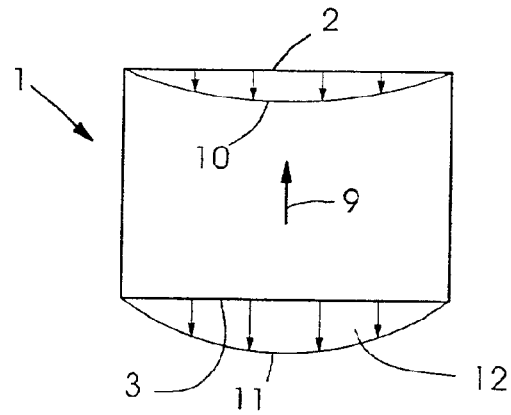
Fig.1.3
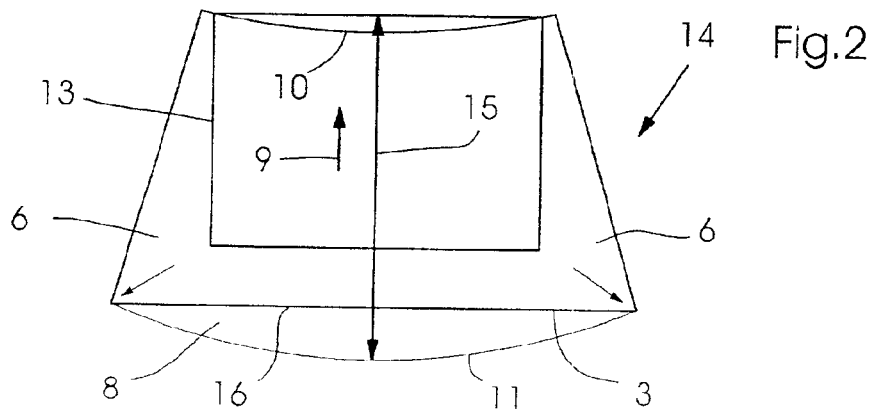
Fig.2

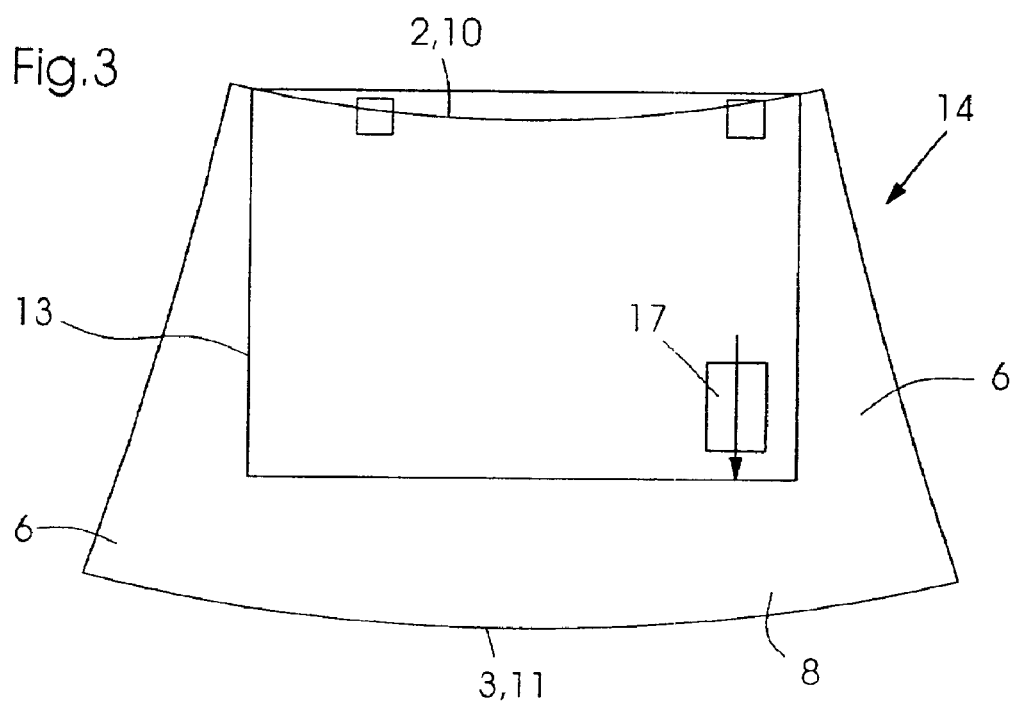

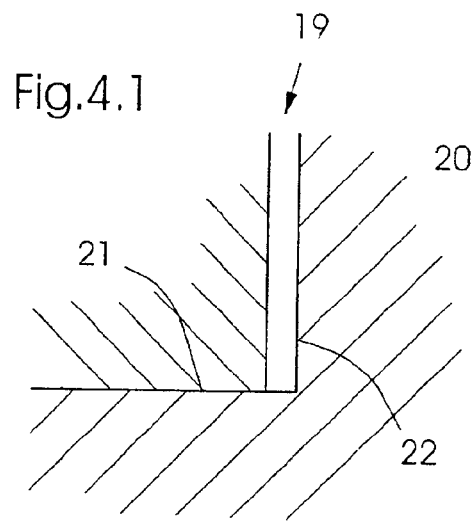
Fig.4.1
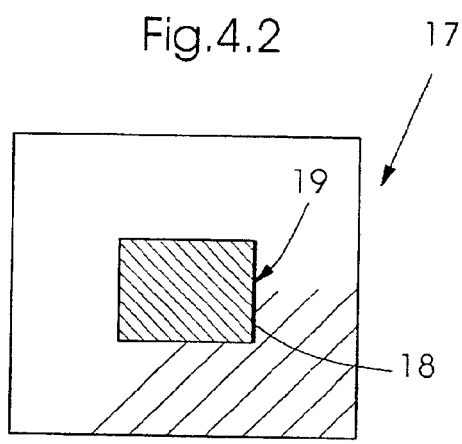
Fig.4.2
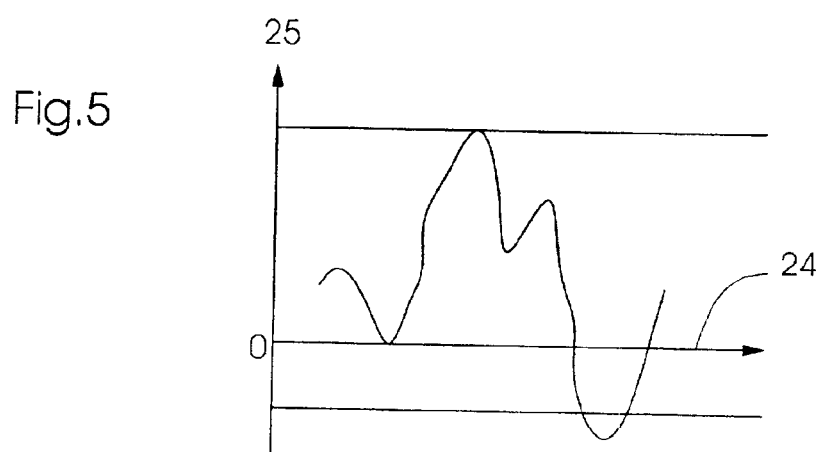
Fig.5 the procedure is, for boundary areas, to print the individual color separations over one another to such an extent that, if there are local deviations of the color separations from one another, no unprinted paper area (flashes) remains visible between the objects. The size of the overlap must ensure that the maximum register differences that occur are covered. On the other hand, in case overlaps are made too large, the dependence of the color areas printed on one another can cause a reinforced visual appearance of the object boundaries. One speaks of the occurrence of so-called "dirty edges", which is likewise undesired on the finished print.

METHOD OF MINIMIZING TRAPPING, I.E., CHOKING OR SPREADING, IN A PRINTING-ORIGINAL PRODUCTION PROCESS

BACKGROUND OF THE INVENTION

Field of the Invention

The invention relates to a method of minimizing trapping, i.e., choking or spreading, in a printing-original production process, in particular on printing copies with different colored boundary areas.

The published German Patent Document DE 196 38 967 C2 is concerned with a group of measurement fields and a method of registering optically detectable printing-technology variables in multicolor production printing or final printing runs. The groups of measurement fields are optically scannable onto a multicolored printed sheet with a predefined structure by a printing machine. For each measurement field, at least one measurement-field map exhibits a specific rotation relative to the printing direction. In order to determine at least one optical printing variable, each measurement field has a minimum dimension which is sufficiently large, in terms of area, for allowing a measurement of the area coverage also to be made. Assigned to the measurement fields is at least one narrow strip in the print, which extends at a relatively small distance from the edge of the measurement field. The desired or nominal area, which is to remain free of ink in the same print, and which is located between the edge of the measurement field and the strip, can be compared with the corresponding actual area.

U.S. Pat. No. 4,583,116 is concerned with a method of registering a multiplicity of printing parameters. In performing the proposed method of this reference, an effort is made to compensate, in multicolor printing, for the errors which occur when superimposing the respective color separations for magenta, cyan, yellow and black. Within the printed image, a section is defined, within which the color separation signal determining the contour of the region is determined. Depending upon the color separation signals which are obtained, the boundaries of regions of mutually overlapping colors are shifted in relation to one another in accordance with the color separation signal determined to be predominant.

In addition, attempts have been made to determine the spreading widths automatically in order to generate spreading frames on colored edges on a printed page. A test plate with an arrangement of test elements was printed, the test elements containing a number of test element patterns with predefined desired positions. The printed test plates are scanned and the image data of the test elements are stored. By analyzing the image data test elements, the actual positions of the test element patterns and their deviations from the desired positions are determined. For two color separations in each case, the shifts in the test element patterns in relation to one another are determined, an optimum spreading width between the color separations being calculated from the shifts.

In the preprinting stage, in order to compensate for register differences in the print, trapping, i.e., choking and spreading, must be applied in printing originals. This choking or spreading is used in the color separation if different colored objects adjoin one another in the subsequent print. In order to avoid so-called "flashes", which can appear as white transparently between adjacent colored areas in the printing process, colored areas have to be enlarged, i.e., spread, or reduced, i.e., choked. The objective of this procedure is, for boundary areas, to print the individual color separations over one another to such an extent that, if there are local deviations of the color separations from one another, no unprinted paper area (flashes) remains visible between the objects. The size of the overlap must ensure that the maximum register differences that occur are covered. On the other hand, in case overlaps are made too large, the dependence of the color areas printed on one another can cause a reinforced visual appearance of the object boundaries. One speaks of the occurrence of so-called "dirty edges", which is likewise undesired on the finished print.

The intensity of the spreading or choking must therefore be selected as large as required based upon the register differences, but on the other hand kept as small as possible.

SUMMARY OF THE INVENTION

In view of the indicated prior art and the technical problem outlined hereinbefore, it is an object of the invention to provide a method of minimizing trapping, i.e., spreading or choking, in a printing-original production process, which avoids the aforementioned disadvantages of the heretofore known processes of this general type.

With the foregoing and other objects in view, there is provided, in accordance with the invention, a method of determining trapping, i.e., spreading or choking, in color boundary areas in a printed image, which comprises characterizing with respect to register behavior one of a printing machine and a printing machine type, respectively, which is performing a printing; determining the printing-machine specific register behavior with knowledge of influencing factors relating to the color to be printed and the printing material to be printed on for the job being printed; calculating minimum required spreadings and chokings, respectively, while taking a safety margin into account; and taking into account minimum geometric overlaps in producing an original.

In accordance with another mode, the method of the invention includes taking the register behavior into account individually with respect to transfer register differences of individual printing units in relation to one another.

In accordance with a further mode, the method of the invention includes taking the register behavior into account in a printing-machine specific manner with regard to register changes during speed changes.

In accordance with an added mode, the method of the invention includes taking printing-machine specific parameters into account with respect to at least one of narrower/wider printing, shorter/longer printing, and round printing, respectively.

In accordance with an additional mode, the method of the invention includes taking printing-machine specific influencing factors into account with respect to dampening needed specifically for a job.

In accordance with yet another mode, the method of the invention includes taking locally occurring register differences into account locally.

In accordance with yet a further mode, the method of the invention includes providing that the spreading and choking, respectively, extend direction-dependently differently in circumferential and lateral direction.

In accordance with a concomitant mode of the method of the invention, the spreading and choking, respectively, take into account a dependence upon a printing-unit combination.

The invention is thus based on the object of determining the spread or choke in different colored boundary areas by using the information about the register properties and the printing material behavior which is established during the printing in the machine.

According to the invention, this object is achieved by a method of determining spread or choke in color boundary areas in the printed image in accordance with the following method steps:

characterizing the printing machines or the printing machine type performing the printing with regard to the register behavior, determining the printing-machine specific register behavior in the knowledge of the influencing factors relating to the colors to be printed and the printing material to be printed on for the current job, calculating the minimum required spread or choke, taking a safety margin into account, and taking minimum geometric overlaps into account in the production of the original within the preprinting stage.

The advantages which can be achieved with the method proposed according to the invention can be seen primarily in the fact that individual optimization of the spread or choke can then be performed using job-specific and printing-machine specific information. Taking notice of the register differences which arise with regard to transfer register and register differences which arise at a speed change during printing, the influences of the deformation behavior of the printing material during the passage thereof through the printing machine can be taken into account, as can the color to be processed in the printing machine and also the dampening. It is therefore possible for visible colored edges ("dirty edges"), which otherwise appear in the printed image, to be eliminated, which corresponds to excessively high spread, and also, on the other hand, for "flashes" occurring in the print, to be ruled out effectively.

In advantageous refinement of the method proposed according to the invention, while taking into account the register behavior, the printing-machine specific behavior of transfer register differences of the individual printing units in relation to one another in the running or travel direction of the sheet material can be taken into account. In addition to taking into account the transfer register differences, which can vary from individual printing unit to individual printing unit, the register behavior with regard to the register change during the speed changes which occur can also be taken into account. For example, changes in register which occur during a decrease in speed of the printing machine can be taken into account just as well as register differences which occur during an increase in speed during the printing of the current print job.

In an advantageous refinement of the method proposed according to the invention, the printing-machine specific parameters with regard to printing narrower/wider and/or printing shorter/longer and/or round printing on sheet material can be taken into account. The deformations which arise at the leading edge and trailing edge, and the increase in area associated therewith on the sheet material can likewise be printing-material specific and printing-machine specific, such as the increase in the area of the sheet material in the longitudinal direction that occurs when printing shorter/longer. A consideration of round printing takes into account the phenomenon that a sheet material, as it passes through one or more printing units located behind one another in a rotary printing machine, becomes rounded nonuniformly at the leading edge and trailing edge.

With regard to the printing-machine specific parameters, by using the method proposed according to the invention, even parameters such as the dampening set specifically for the job can be taken into account in interaction with the printing material respectively used. The dependence upon the level of dampening set, which is necessary for the correct continuous or production printing of the current job, in cooperation with the respective printing material that is used, means that the dampening solution absorption behavior of the printing material, which can turn out to be extremely different from printing material to printing material, can be taken into account individually when determining the spread or choke.

In an advantageous development of the method proposed according to the invention, locally occurring register differences can also be taken into account locally. Thus, for example, in the case of the phenomenon of printing narrower/wider, a different width extent arises at the leading edge of the sheet material when compared with the trailing edge of the sheet material.

In addition, by the method proposed according to the invention, spread or choke predefinitions or prescriptions can advantageously be defined differently in the circumferential and lateral direction as a function of the direction. This takes into account the vectorial feature of the spread or choke parameter, that can extend quite differently into the specified directions, which must be taken into account in the production of the printing original.

Furthermore, by the method proposed according to the invention, it is possible, in rotary printing machines which have 2, 4, 6 or 8 color-applying printing units and finishing units in the shape of varnishing units, to take into account the degree of spread or choke as a function of the printing-unit combination. The predefinition of the spreading or choking in a combination of the first and the sixth printing units, for example, of a printing machine having 8 printing units is a different predefinition than a predefinition of the choke or spread in a combination of the first and second printing units, for example, located after one another. As a result, account can be taken of the different deformation tendency of the sheet, increasing in the sheet running direction, through a multicolor printing machine, because the sheet deforms in proportion with the number of printing or finishing units through which it passes.

Other features which are considered as characteristic for the invention are set forth in the appended claims.

Although the invention is illustrated and described herein as embodied in a method of minimizing trapping, i.e., spreading or choking, in the printing-original production process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIGS. 1.1 to 1.3 are diagrams of deformations occurring on sheetlike material with regard to narrower/wider printing, shorter/longer printing and round printing, respectively;

FIG. 2 is a diagram of deformations arising on a copy of a sheet material when the deformation effects according to FIGS. 1.1 to 1.3 are superimposed;

FIG. 3 is an enlarged view of FIG. 2 showing a detail located in the printed image in the deformed area of the sheet material and containing a colored margin;

FIGS. 4.1 and 4.2 are enlarged fragmentary views of FIG. 3, showing the marginal region of the image detail; and FIG. 5 is a plot diagram showing resulting trapping; i.e.; spreading/choking regions, based upon register fluctuations, plotted over one coordinate direction.

DESCRIPTION OF THE PREFERRED EMBODIMENTS

Referring now to the drawings and, first, particularly to FIGS. 1.1 to 1.3, there is shown therein the individual deformation phenomena on sheet material which may arise when performing narrower/wider printing, shorter/longer printing and round printing on sheetlike material.

FIG. 1.1 reveals the deformation of a sheetlike material 1 at a leading edge 2 thereof and a trailing edge 3 thereof, respectively, in detail. In FIG. 1.1, the deformations on the sheetlike material 1 extend only locally, i.e., the sheet leading edge 2 and the sheet trailing edge 3 deform differently in the width extent of the sheetlike material 1. The increasing width of the sheet leading edge 2 is identified by reference numeral 4, while the width increase at the sheet trailing edge 2 of the sheetlike material 1 is identified by reference numeral 5. Viewed overall, the result, on both sides of the undeformed illustrated sheetlike material 1, is an increase in area 6 resulting from the wider printing, which is virtually symmetrical on both sides of the sheet.

FIG. 1.2 shows the effect of the resulting elongation 7 of the sheet material 1 in the sheet travel or running direction represented by the arrow 9. In the trailing region of the sheet 1, when printing shorter/longer, the sheet is generally deflected in the direction of the sheet trailing edge 2, and the ensuing increase in length of the sheetlike material 1 is identified by reference numeral 7. Associated with the lengthening of the sheet, which takes place at least approximately uniformly over the printed width, is an increase in area 8 resulting from the longer printing.

FIG. 1.3 reveals the effect of round printing. In the case of round printing, the sheet leading edge 2 is generally slightly rounded as at 10, while more severe rounding 11 occurs at the sheet trailing edge 3. The increase in area on the sheet material 1, which is caused by the phenomenon of round printing, is identified by reference numeral 12.

FIG. 2 shows the deformations which result on a copy of a sheetlike material when the effects which have been illustrated in FIGS. 1.1, 1.2 and 1.3 are superimposed.

In FIG. 2, a non-deformed sheetlike material 1 is compared with a deformed sheetlike material identified by reference numeral 14. Clearly visible are the geometric deviations in the longitudinal direction 15 and in the width direction 16, in particular in the trailing edge region 3, 11 of the deformed sheet material 14. The deformed sheet material 14 has experienced rounding both in the leading edge region 2, 10 and in the trailing edge region 3, 11, while the side areas of the deformed sheet material 14 are at the same time characterized in detail by the area increase 6 according to the effect of printing wider in FIG. 1.1. In the length increase 15 on the deformed sheet material 14, it is possible to see the lengthening 7 of the sheetlike material 1 (note FIG. 1.2) in the sheet running direction 9. In FIG. 1.2, the length increase 7 of the sheet material 1 extends nearly constantly, as viewed over the width of the sheet material 1, while in FIG. 2, which takes into account the superimposition of all the effects, the length increase 15 on the sheetlike material is also associated with a rounding of the trailing edge 3, 11.

FIG. 3 illustrates a detail located in the printed image in the deformed area of the sheetlike material and contains a colored edge.

FIG. 3 is a plan view of a deformed copy 14 of the sheetlike material 1. Reference symbols 2, 10 identify the rounding at the leading edge of the sheetlike material 14, while reference numeral 6 identifies the increase in width thereof. The original dimensions of the undeformed sheetlike material 1 are identified by reference numeral 13. In the rear area or trailing area of the deformed sheet material 14, i.e., in the area which has been deformed by the increase in area 6 due to printing wider, a subject detail, together with an associated coordinate system in the X, Y direction, is identified by reference numeral 17. The subject detail 17 is located at one side of the sheet in the vicinity of the sheet trailing edge, which may have experienced a lengthening 7 and 15, respectively, in a printing-unit specific manner, depending upon the passage of the sheetlike material 1 through the printing units of a rotary printing machine, which are arranged in tandem, and in the region of the sheetlike material 14 which, due to a deformation in the width direction resulting from the wider printing according to that illustrated in FIG. 1 or FIG. 2, has experienced an increase in area 6 perpendicularly to the sheet running direction 9.

FIGS. 4.1 and 4.2 show enlarged views of the edge region of the image detail according to FIG. 3.

FIG. 4.1 reveals a local shift between two color separations in relation to one another in detail. The colors represented by hatching extending in different directions are, for example, magenta and cyan, the colored edges 21 and 22 of which do not touch or overlap one another. This effect, caused by the geometric change in the printing material, would lead, without spreading, to no color being applied in the area 19, and this would result in this area 19 subsequently being visible in the form of a flash in the print. The spreading area must therefore be chosen so large that the area 19 is covered.

FIG. 4.2 shows the position of a segment detail 17 in a smaller-scale illustration, it being possible for a color boundary to be formed within the transition region 19, for example, of the colors cyan and magenta.

FIG. 5 shows the resulting spreading or choking areas in a subject detail as a function of the register fluctuations 25 of the corresponding color separations in relation to one another, plotted over a coordinate direction.

In FIG. 5, register fluctuations 25 of two color separations in relation to one another in continuous or production printing are shown, wherein the geometric displacement in the printing direction and transversely thereto is plotted against the sheets 24 printed after one another. The range of the register values must be covered by the spreading and choking, respectively.

The object of the method proposed in accordance with the invention is to take into account printing-machine specific parameters with influencing factors such as moisture, deformation behavior of the printing material to be printed and viscosity behavior of the color to be printed during the processing of a print job. The transfer register and the register changes, respectively, which arise during speed changes in the rotary printing machine represent printing-machine specific parameters, which can be stored in the form of characteristic curves for further processing. In addition to the printing-machine specific parameters, the deformation behavior of the printing material to be printed represents a considerable influencing factor, as does the job-specific dampening requirement.

The register differences with regard to transfer register and register changes during speed changes which arise based upon the jobs already carried out are known for each printing unit in a printing machine and may be taken into account when producing the printing original in the preprinting stage. By the method proposed in accordance with the invention, it is additionally possible for the interplay between the influencing factors of the set dampening and the printing material to be printed, and also the combination of these two influencing parameters, to be taken into account. The printing material, the surface of which is printed, together with the ink, by an ink/dampening solution emulsion, in interplay or cooperation with the set dampening, has a different expansion behavior in the circumferential and the width direction, respectively, depending upon whether it is a coated paper or board or another printing material. The expansion behavior can be influenced in a job-specific manner by the set dampening, as can the pressure set in the printing nip between the printing plate and the rubber blanket. These influencing factors can likewise be taken into account with the method proposed in accordance with the invention for determining the spreading or choking predefinitions or prescriptions. In addition, the method proposed in accordance with the invention permits the order of printing units in the printing-unit combination to be taken into account with regard to the sequence of the printing units. By using the method proposed in accordance with the invention, for example, a first printing unit and a second printing unit can be combined with one another, it being possible, in connection with the second printing unit, to take into account the more severe deformation which arises in the printing material of the sheet material 1 to be processed in the undeformed state, as compared with the deformed state 14 thereof. A subject detail 17 which is compared with regard to the deformation 14 thereof between two printing units located directly after one another, will have a different deformation than a sheet material 1 which is compared between the first printing unit and, for example, the second printing unit. In the second printing unit, as viewed in the sheet running direction 9, the result has been a significantly more severe deformation, and therefore a significantly more severe deformation of the subject detail 17 which, during the printing of the printing-material surface in the second printing unit, leads to spreading or choking predefinitions which are different in relation to the first printing unit.

I claim:

1. A method of determining trapping in color boundary areas in a printed image comprising the steps of: characterizing with respect to register behavior one of a printing machine and a printing machine type, respectively, performing a printing; determining the printing-machine specific register behavior with knowledge of influencing factors relating to the color to be printed and the printing material to be printed on for the job being printed; calculating minimum required trappings while taking into account a safety margin; and taking into account minimum geometric overlaps in producing an original.

2. The method according to claim 1, which includes taking the register behavior into account individually with respect to transfer register differences of individual printing units in relation to one another.

3. The method according to claim 1, which includes taking the register behavior into account in a printing-machine specific manner with regard to register changes during speed changes.

4. The method according to claim 1, which includes taking printing-machine specific parameters into account with respect to at least one of narrower/wider printing, shorter/longer printing, and round printing, respectively.

5. The method according to claim 1, which includes taking printing-machine specific influencing factors into account with respect to dampening needed specifically for a job.

6. The method according to claim 1, which includes taking locally occurring register differences into account locally.

7. The method according to claim 1, which includes providing that the spreading and choking, respectively, extend direction-dependently differently in circumferential and lateral direction.

8. The method according to claim 1, wherein the spreading and choking, respectively, take into account a dependence upon a printing-unit combination.

* * * * *